(12) United States Patent
Klatt (10) Patent No.: US 9,736,812 B2
(45) Date of Patent: Aug. 15, 2017

(54) METHOD FOR USING A USER EQUIPMENT WITH A FIRST PUBLIC LAND MOBILE NETWORK AND WITH A SECOND PUBLIC LAND MOBILE NETWORK, USER EQUIPMENT, PROGRAM AND COMPUTER PROGRAM PRODUCT

(75) Inventor: Axel Klatt, Cologne (DE)

(73) Assignee: DEUTSCHE TELEKOM AG, Bonn (DE)

( * ) Notice: Subject to any disclaimer, the term of this patent is extended or adjusted under 35 U.S.C. 154(b) by 193 days.

(21) Appl. No.: 14/373,042

(22) PCT Filed: Jan. 23, 2012

(86) PCT No.: PCT/EP2012/000276
§ 371 (c)(1),
(2), (4) Date: Jul. 18, 2014

(87) PCT Pub. No.: WO2013/110284
PCT Pub. Date: Aug. 1, 2013

(65) Prior Publication Data
US 2015/0005018 A1    Jan. 1, 2015

(51) Int. Cl.
*H04W 68/00*  (2009.01)
*H04W 68/02*  (2009.01)
*H04W 88/06*  (2009.01)
*H04W 76/04*  (2009.01)
*H04W 88/02*  (2009.01)

(52) U.S. Cl.
CPC ......... *H04W 68/02* (2013.01); *H04W 76/048* (2013.01); *H04W 88/02* (2013.01); *H04W 88/06* (2013.01); *H04W 68/00* (2013.01)

(58) Field of Classification Search
CPC ... H04W 68/00; H04W 68/02; H04W 68/025; H04W 88/02; H04W 88/06; H04W 76/02; H04W 76/048
USPC .............................................. 455/458, 426.1
See application file for complete search history.

(56) References Cited

U.S. PATENT DOCUMENTS

| 8,725,145 | B2 * | 5/2014 | Mutya | ................ | H04W 76/048 455/435.1 |
| 8,914,035 | B2 * | 12/2014 | Roullier | ................ | H04W 76/02 455/458 |
| 2007/0275746 | A1 | 11/2007 | Bitran | | |

(Continued)

FOREIGN PATENT DOCUMENTS

WO    WO 2007091245 A2    8/2007
WO    WO 2011056250 A1    5/2011

*Primary Examiner* — Wayne Cai
(74) *Attorney, Agent, or Firm* — Leydig, Voit & Mayer, Ltd.

(57) ABSTRACT

A method for using a user equipment with a first public land mobile network and a second public land mobile network includes operating the user equipment, with respect to the first public land mobile network, according to a discontinuous reception scheme in an idle mode of the user equipment and operating the user equipment, with respect to the second public land mobile network, in a connected mode of the user equipment. In the connected mode with respect to the second public land mobile network, transmission of data from the second public land mobile network to the user equipment is prevented during a paging occasion time interval of the discontinuous reception scheme corresponding to the first public land mobile network.

10 Claims, 2 Drawing Sheets

(56) References Cited

U.S. PATENT DOCUMENTS

| | | |
|---|---|---|
| 2009/0131054 A1 | 5/2009 | Zhang |
| 2010/0202429 A1 | 8/2010 | Chin et al. |
| 2011/0217969 A1 | 9/2011 | Spartz et al. |
| 2012/0051285 A1* | 3/2012 | Hou ...................... H04W 68/00 370/328 |
| 2012/0157033 A1* | 6/2012 | Ou ........................ H04W 74/04 455/404.1 |
| 2013/0065644 A1* | 3/2013 | Bishop .................. H04W 8/183 455/558 |
| 2013/0090137 A1* | 4/2013 | Krishnamoorthy ... H04W 68/02 455/458 |

* cited by examiner

METHOD FOR USING A USER EQUIPMENT WITH A FIRST PUBLIC LAND MOBILE NETWORK AND WITH A SECOND PUBLIC LAND MOBILE NETWORK, USER EQUIPMENT, PROGRAM AND COMPUTER PROGRAM PRODUCT

CROSS-REFERENCE TO RELATED APPLICATIONS

This application is a U.S. National Phase application under 35 U.S.C. §371 of International Application No. PCT/EP2012/000276, filed on Jan. 23, 2012. The International Application was published in English on Aug. 1, 2013 as WO 2013/110284 under PCT Article 21(2).

FIELD

The present invention relates a method for using a user equipment with a first public land mobile network and with a second public land mobile network, wherein the user equipment is as DSDS user equipment (Dual SIM dual standby user equipment).

The present invention further relates to a user equipment for use with a first public land mobile network and with a second public land mobile network, wherein the user equipment is as DSDS user equipment (Dual SIM dual standby user equipment).

BACKGROUND

In cellular mobile systems like GSM (Global System for Mobile communication) (but also in cellular public land mobile networks according to its successors like UMTS (Universal Mobile Telecommunications System) or E-UTRAN (Evolved UMTS Terrestrial Radio Access Network)/LTE (Long Term Evolution)), the so-called "PLMN Selection" (PLMN=Public Land Mobile Network) is performed by the user equipment (UE) as defined in [3GPP TS 22.011]. Subsequently this selected PLMN becomes the so-called "registered public land mobile network" or "registered PLMN" (RPLMN) of the terminal (user equipment). Details can be found in [3GPP TS 23.122] for cellular mobile systems according to the 3GPP standard.

While a user equipment is kept registered on the registered public land mobile network, it can originate mobile originated calls (MOC) and receive mobile terminated calls (MTC). This is the default state a normal UE is in, in order to provide service to the customer.

Typically in cellular mobile systems each user equipment has only a single public land mobile network to which is has been registered (single registered public land mobile network) and to and from which services like MOC and MTC are provided.

As a single public land mobile network can provide typically all service other PLMNs can also offer. The main reason to select a certain public land mobile network or operator for a contract is—besides quality of the network—the price of the service being charged. As there is a desire of customers to optimise payments in the recent past so-called "Dual-SIM/Dual-Standby" (DSDS) devices came to the markets. Such user equipments are, e.g., known from the publication US 2011/0217969 A1.

These DSDS terminals or user equipments consist basically of two terminals in a single terminal housing. For price reasons, these terminals do not consist of two fully independent terminals in a single housing, but manufactures of such devices aim to reuse as much as possible of the device to allow independent operation.

For the end customers such devices allow the operation of a single device in two independent cellular public land mobile networks. Therefore, it is possible to use two independent subscriptions also with two different operators. This provides multiple possibilities to the customer, like:

Being reachable with two independent telephone numbers (e.g. a private and a business one);

Allow two different contracts (e.g. a private one for private calls and a business one)

In case of abroad roaming, a local subscription to receive and place cheap local (national) calls and the normal international subscription to be reachable via the normal number;

Different types of contracts with the different public land mobile networks, such as a voice call contract with the first public land mobile network (PLMN 1) and a data contract with the second public land mobile network (PLMN 2);

A single terminal with two subscriptions in different regions (no need to swap SIMs) when no roaming between the operators is in place.

It is possible with a single DSDS device or DSDS user equipment to use more than a single radio access technology concurrently on the same or different PLMNs.

Technically, such DSDS user equipments or DSDS mobile devices consist of two subscriber identity modules (SIM) inserted in two terminal devices, while both of the baseband devices are sharing a single radio frequency front-end for cost reasons.

In order to save power consumption of mobile devices (user equipments), cellular systems (i.e. cellular public land mobile networks)—like any of the 3GPP systems—implement the concept of discontinuous reception (DRX). This concept allows battery powered devices like mobile phones as user equipments to optimise the power consumption by falling into a so-called "sleep mode" most of the time while no communication is ongoing. The systems typically have defined "wakeup-times" during which the terminal listens to the Paging Channel (PCH) which notifies terminals about MTC (Mobile Terminated Calls). These wake-up times are defined for example for UMTS in [3GPP TS 25.304] and E-UTRAN/LTE in [3GPP TS 36.304].

Terminals (user equipments) are configured to follow a predefined interval, called DRX cycle, i.e. a time interval, which defines times during which the terminal is required to be pageable via the PCH. Typical time intervals or cycles are ranging between 0.320 s and 2.56 s. E.g. by defining a DRX cycle of 1.28 s, the terminal needs to wake up every 1.28 s to receive a potentially mobile terminating call which is indicated via the paging channel PCH. If the terminal in a given DRX occasion is not addressed on the PCH, it will fall back to sleep and wake up after another period of the time interval, i.e.—in this example—after another 1.28 s. The given reference specifications also define a formula how a UE has to calculate it's assigned DRX cycle using parameters from the broadcast channels of the given cellular public land mobile network and other input parameters, such as the SIM International Mobile Subscriber Identity (IMSI) of the user equipment.

The network is aware of the timing of the user equipment DRX cycle and thus will page the terminal on the PCH only at those times when the terminal is woken up and listens to the PCH.

This DRX concept has also the benefit that the paging rate for terminals can be spread in time as not all terminals follow the same DRX cycle and thus will not be paged at the same point in time. This concept allows efficient utilisation of the PCH channel resources.

DSDS terminals in contrast to a normal single SIM UE have two independent SIM cards (also with individual IMSIs). Hence in order to be pageable they also need to follow two independent DRX cycles (typically calculated based on the individual IMSIs).

The subscriptions of the two SIM cards can either relate to the same public land mobile network or to different public land mobile networks.

As especially for the case of independent public land mobile networks (i.e. the first public land mobile network is different to the second public land mobile network), no coordination of the individual DRX cycles is possible due to the fact that the public land mobile networks are not coordinated (i.e. there is an absolute time offset between the beginning of a radio frame (or other timing structure) in the first public land mobile network and the beginning of a radio frame (or other timing structure) in the second public land mobile network), the user equipment tracks both of the DRX cycles on its own. This becomes especially problematic while a DSDS user equipment is in data communication with the second public land mobile network while it still needs to ensure to follow the DRX cycle for reading the paging channel of the first public land mobile network.

With conventional DSDS terminals or user equipments, typically the user equipment autonomously tunes its radio front-end at the time intervals implied for the individual DRX cycles from the second public land mobile network to the first public land mobile network in order to ensure that MTCs from the first PLMN are not missed. In effect this means that for a short time, the user equipment or terminal cannot receive the data transmission from the second public land mobile network while reading the paging channel of the first public land mobile network.

As modern cellular data systems like Highspeed Data Packet Access (HSPA) or Long Term Evolution (LTE) are so-called "fully scheduled systems using a shared channel for a range of active terminals" this also becomes problematic in terms of system efficiency.

While the second public land mobile network schedules the terminal according to the rules defined by the second public land mobile network, the user equipment autonomously tunes away from the data reception from the second public land mobile network to receive the paging channel of the first public land mobile network. By doing so, data being sent to the user equipment by the second public land mobile network is lost and needs to be retransmitted during the next time the user equipment again listens to the second public land mobile network.

Besides loss of radio system efficiency this behaviour might also have a quite negative impact on the user experience. Especially if the data loss is such high that the TCP/IP retransmission behaviour is triggered resulting in a slow start of the TCP/IP connection.

SUMMARY

In an embodiment, the invention provides a method for using a user equipment with a first public land mobile network and a second public land mobile network. The user equipment is a Dual Subscriber Identity Module (SIM) dual standby (DSDS) user equipment. The first public land mobile network and the second public land mobile network are registered public land mobile networks relative to the user equipment. The method includes: operating the user equipment, with respect to the first public land mobile network, according to a discontinuous reception scheme in an idle mode of the user equipment, wherein, in the discontinuous reception scheme, a paging occasion time interval is defined based on: a time interval corresponding to a discontinuous reception cycle length, and a paging time within the time interval such that, in the discontinuous reception scheme, the user equipment only monitors a paging channel during the paging occasion time interval with respect to the first public land mobile network; and operating the user equipment, with respect to the second public land mobile network, in a connected mode of the user equipment. In the connected mode with respect to the second public land mobile network, transmission of data from the second public land mobile network to the user equipment is prevented during the paging occasion time interval of the discontinuous reception scheme corresponding to the first public land mobile network.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

In an embodiment, the present invention provides a simple solution for using a user equipment with a first public land mobile network and with a second public land mobile network that avoids deterioration of the overall system efficiency, especially in the situations described above. The present invention, therefore, relates to enhancing system efficiency in terms of reliability of data transmission as well as overall system efficiency in a cellular mobile network. It enables the enhanced efficiency for the terminal standby time by taking individual parameters of more than one cellular public land mobile network into account with regard to the operation of a single terminal concurrently in two cellular public land mobile network networks.

In an embodiment, the present invention provides a method for using a user equipment with a first public land mobile network and a second public land mobile network, wherein the user equipment is as DSDS user equipment (Dual SIM dual standby user equipment), wherein the first public land mobile network is a registered public land mobile network to the user equipment and wherein the second public land mobile network is also a registered public land mobile network to the user equipment, wherein a first mode of operation of the user equipment corresponds, with respect to the first public land mobile network, to the use of a discontinuous reception scheme in an idle mode of the user equipment, wherein in the discontinuous reception scheme of the user equipment, a paging occasion time interval is defined by way of:

a time interval corresponding to a discontinuous reception cycle length, and    a paging time within the time interval such that, in the discontinuous reception scheme, the user equipment needs only to monitor a paging channel during the paging occasion time interval, wherein a second mode of operation of the user equipment corresponds, with respect to the first public land mobile network, to the use of the discontinuous reception scheme in the idle mode of the user equipment, and, with respect to the second public land mobile network, to a connected mode of the user equipment, wherein, in the second mode of operation of the user equipment, during the transmission of data from the second public land mobile network to the user equipment, the transmission of data is prevented during the paging occasion time interval.

The method enables enhanced system efficiency with terminals operating in a concurrent mode in more than a single PLMN. The present invention is aimed at so-called dual-SIM dual standby (DSDS) terminals (also called DSDS user equipments), which allow concurrent operation of such terminals in at least two cellular radio technologies or PLMNs. The method and program is applicable for any combination of at least two cellular networks, like for example: GERAN, UTRAN, LTE/E-UTRAN, LTE-Advanced, cdma2000, WiMAX, WiBro, WLAN etc or and variants thereof.

According to the present invention, it is advantageously possible that data packets of a data transmission between the second public land mobile network and the user equipment are not lost due to repeatedly tuning the base band circuitry of the user equipment to receiving paging signals emitted by the (base station or eNB or other base station device of the) first public land mobile network during such paging occasion time intervals as prescribed by the discontinuous reception cycle applied to the user equipment by the first public land mobile network (while the user equipment being registered in the first public land mobile network but in idle mode with respect to the first public land mobile network).

According to another embodiment of the present invention, it is preferred that, in the second mode of operation of the user equipment, during the transmission of data from the second public land mobile network to the user equipment, the transmission of data is prevented, additionally to during the paging occasion time interval, during a first time interval preceding the paging occasion time interval and/or during a second time interval following the paging occasion time interval.

According to the present invention, it is thereby advantageous that the transmission safety and the reliability of the data transmission is further enhanced and the available time span to send data packets, by the second public land mobile network, to the user equipment is only slightly reduced. It is preferred that the transmission of data is prevented both during the first time interval preceding the paging occasion time interval and during the second time interval following the paging occasion time interval.

According to a first variant of a further preferred embodiment of the present invention, during changing to the connected mode of the user equipment in the second mode of operation, a timing information is transmitted from the user equipment to the second public land mobile network, the timing information being indicative of the paging occasion time interval.

According to a second variant of a further preferred embodiment of the present invention, a timing information is transmitted from the user equipment to the second public land mobile network during the second mode of operation of the user equipment, the timing information being indicative of the paging occasion time interval.

According to both mentioned variants of the present invention, it is advantageously possible according to the present invention that the second public land mobile network receives the relevant information that defines the paging occasion time interval to prevent the transmission of data from the second public land mobile network to the user equipment at least during the paging occasion time interval (and preferably also during at least the first time interval preceding the paging occasion time interval or the second time interval following the paging occasion time interval). According to the first variant, the relevant information to define the paging occasion time interval is transmitted from the user equipment to the second public land mobile network during changing to the connected mode of the user equipment (i.e. from changing of the user equipment (with respect to the second public land mobile network), e.g. from the idle mode, to the connected mode (e.g. the RRC connected mode) in the second mode of operation. According to the second variant, the relevant information to define the paging occasion time interval is transmitted from the user equipment to the second public land mobile network while already being in the second mode of operation (i.e. while already in connected mode with respect to the second public land mobile network).

According to another preferred embodiment of the present invention, the timing information indicates    the time interval, and    the paging time within the time interval.

According to such an embodiment, it is possible, for the second public land mobile network, to determine (in absolute terms) the paging occasion time interval based on a transmission of the time interval (i.e. the length of the discontinuous reception cycle length) and the paging time (within the time interval). This scenario is especially applicable in case that the absolute time base (i.e. an indication of the absolute time offset between the beginning of a radio frame (or of another timing structure) in the first public land mobile network and the beginning of a radio frame (or of another timing structure) in the second public land mobile network) is known to the second public land mobile network.

According to the present invention, it is furthermore preferred that the timing information comprises    the time interval,    the paging time within the time interval, and    an offset information indicative of the absolute time offset between the beginning of a radio frame in the first public land mobile network and the beginning of a radio frame in the second public land mobile network.

According to such an embodiment, it is possible, for the second public land mobile network, to determine (in absolute terms) the paging occasion time interval based on a transmission of the time interval (i.e. the length of the discontinuous reception cycle length), the paging time (within the time interval), and the offset information indicative of the absolute time offset between the beginning of a radio frame (or of another timing structure) in the first public land mobile network and the beginning of a radio frame (or of another timing structure) in the second public land mobile network.

According to the present invention, it is furthermore preferred that the timing information is transmitted from the user equipment to the second public land mobile network by way of a RRC (Radio Resource Control) connection request message or by way of a RRC connection request complete message.

This solution especially relates to the first variant mentioned above, where the timing information being indicative of the paging occasion time interval is transmitted during changing to the connected mode of the user equipment in the second mode of operation. However, it is also possible to use a RRC (Radio Resource Control) connection request message or a RRC connection request complete message to transmit the timing information while the user equipment being already in the second mode of operation, i.e. in connected mode. Additionally, it is also possible to transmit the timing information (being indicative of the paging occasion time interval)—either during the initiation of the second mode of operation or while the user equipment being in the second mode of operation—by way of another message or type of message, e.g. by using RRC signaling or NAS signaling during the attach procedure (of the user equipment with the second public land mobile network).

Furthermore, the present invention relates to a user equipment for use with a first public land mobile network and with a second public land mobile network, wherein the user equipment is as DSDS user equipment (Dual SIM dual standby user equipment), wherein the first public land mobile network is a registered public land mobile network to the user equipment and wherein the second public land mobile network is also a registered public land mobile network to the user equipment, wherein a first mode of operation of the user equipment corresponds, with respect to the first public land mobile network, to the use of a discontinuous reception scheme in an idle mode of the user equipment, wherein in the discontinuous reception scheme of the user equipment, a paging occasion time interval is defined by way of:
  a time interval corresponding to a discontinuous reception cycle length, and
  a paging time within the time interval such that, in the discontinuous reception scheme, the user equipment needs only to monitor a paging channel during the paging occasion time interval,
wherein a second mode of operation of the user equipment corresponds,
  with respect to the first public land mobile network, to the use of the discontinuous reception scheme in the idle mode of the user equipment, and,
  with respect to the second public land mobile network, to a connected mode of the user equipment,
wherein, in the second mode of operation of the user equipment, during the transmission of data from the second public land mobile network to the user equipment, the transmission of data is prevented during the paging occasion time interval.

With such a user equipment, it is advantageous according to the present invention that the number of lost data packets can be reduced as the second public land mobile network avoids sending data packets during the paging occasion time intervals.

It is furthermore preferred according to the present invention—also with respect to the user equipment—that, in the second mode of operation of the user equipment, during the transmission of data from the second public land mobile network to the user equipment, the transmission of data is prevented, additionally to during the paging occasion time interval, during a first time interval preceding the paging occasion time interval and/or during a second time interval following the paging occasion time interval.

According to further preferred embodiments of the present invention—also with respect to the user equipment—it is preferred that
  during changing to the connected mode of the user equipment in the second mode of operation, a timing information is transmitted from the user equipment to the second public land mobile network, the timing information being indicative of the paging occasion time interval, or that
  a timing information is transmitted from the user equipment to the second public land mobile network during the second mode of operation of the user equipment, the timing information being indicative of the paging occasion time interval.

Additionally, the present invention relates to a program comprising a computer readable program code which, when executed on a computer or on a user equipment, causes the computer or the user equipment to perform the inventive method.

Still additionally, the present invention relates to computer program product for using a user equipment with a first public land mobile network and with a second public land mobile network, the computer program product comprising a computer program stored on a storage medium, the computer program comprising program code which, when executed on a computer or on a user equipment, causes the computer or the user equipment to perform the inventive method.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Figure 1:
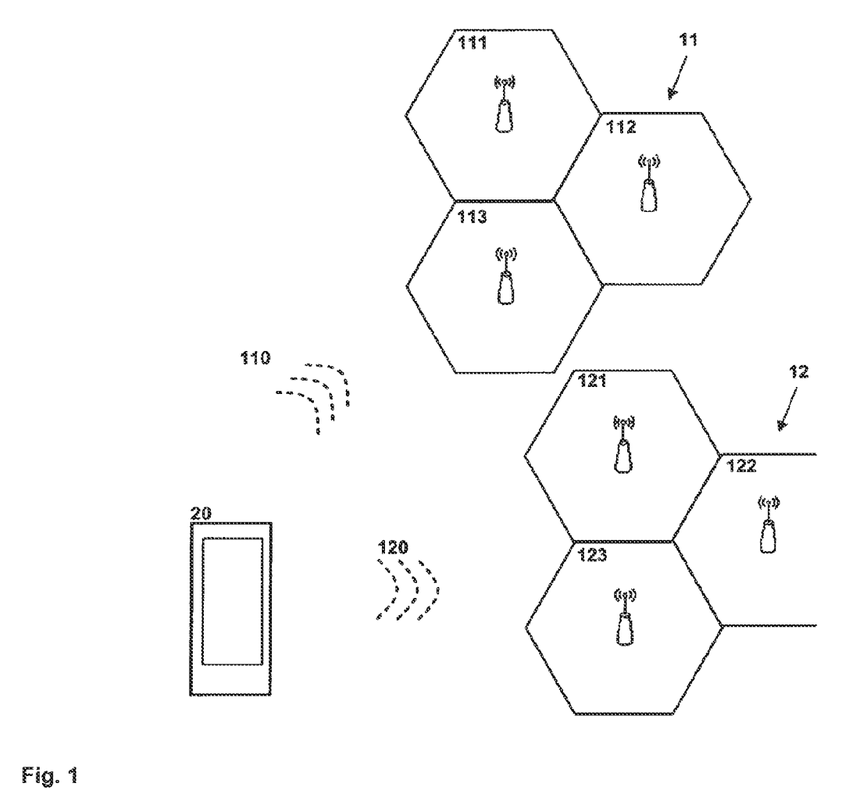
FIG. 1 schematically illustrates a user equipment being a DSDS (Dual SIM dual standby user equipment) user equipment and being used with a first public land mobile network and a second public land mobile network according to the present invention.

In FIG. 1, a user equipment 20 is schematically shown with a first public land mobile network 11 and a second public land mobile network 12. Both the first and the second public land mobile networks 11, 12 are cellular public land mobile networks and comprise a plurality of network cells or radio cells, typically served by one or a plurality of base station entities such as BTS (Base Transceiver Stations), base stations, eNB (e-NodeBs) or the like.

In the example shown in FIG. 1, the first public land mobile network 11 comprises a first radio cell 111, a second radio cell 112, and a third radio cell 113. The second public land mobile network 12 comprises a fourth radio cell 121, a fifth radio cell 122, and a sixth radio cell 123.

Furthermore, in the example shown in FIG. 1, the user equipment 20 is a so-called DSDS (Dual SIM dual standby user equipment) user equipment and is used with both the first public land mobile network 11 and the second public land mobile network 12, i.e. the user equipment 20 can especially be used concurrently both with the first public land mobile network 11 and the second public land mobile network 12. This is represented in FIG. 1 by way of a first radio frequency signal 110 indicative of the communication between the user equipment 20 and the first public land mobile network 11, and a second radio frequency signal 120 indicative of the communication between the user equipment 20 and the second public land mobile network 12. This means that the first public land mobile network 11 is a registered public land mobile network (RPLMN) to the user equipment 20 and that the second public land mobile network 12 is also a registered public land mobile network (RPLMN) to the user equipment 20.

Figure 2:
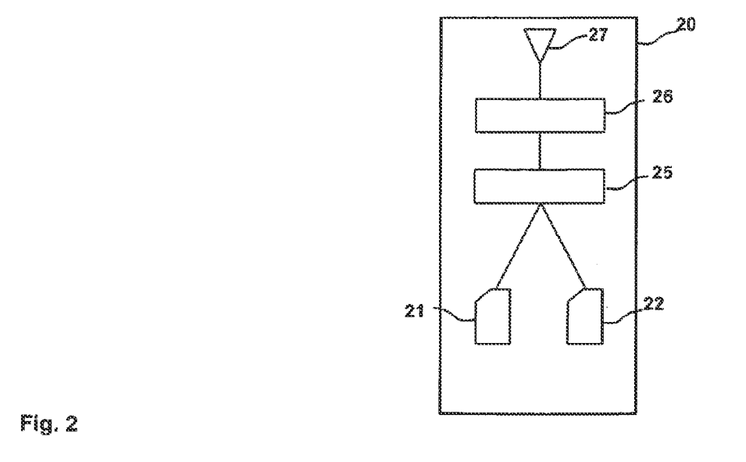
FIG. 2 schematically illustrates a DSDS (Dual SIM dual standby user equipment) user equipment in the form of a block diagram.

In FIG. 2, a DSDS (Dual SIM dual standby) user equipment 20 in the form of a block diagram is schematically shown. Different parts of such a user equipment 20 are shown, namely,
- a first SIM card 21, the first SIM card 21 being inserted in a corresponding first SIM card module (not specifically shown in FIG. 1) of the user equipment 20,
- a second SIM card 22, the second SIM card 22 being inserted in a corresponding second SIM card module (not specifically shown in FIG. 1) of the user equipment 20,
- a baseband module 25 for handling the radio signal generation processing within the user equipment 20,
- a RF (radio frequency) frontend 26, and
- an antenna 27

In a first mode of operation of the user equipment 20 (the first mode of operation being not represented in the figures), the user equipment 20 uses a discontinuous reception scheme with respect to the first public land mobile network 11. Especially, the user equipment 20 is in idle mode and uses the discontinuous reception scheme to save energy, i.e. besides paging at occasion time intervals (that are repeated according to the discontinuous reception scheme), the user equipment 20 does not listen to a paging channel of the first public land mobile network 11. It can well be the case that, in the first mode of operation, the user equipment 20 is also in an idle mode with respect to the second public land mobile network 12.

In a second mode of operation of the user equipment 20, the user equipment 20 still uses the discontinuous reception scheme with respect to the first public land mobile network 11 (i.e. the user equipment 20 is especially in the idle mode with respect to the first public land mobile network 11), but the user equipment 20 is in a connected mode with respect to the second public land mobile network 12.

Figure 3:
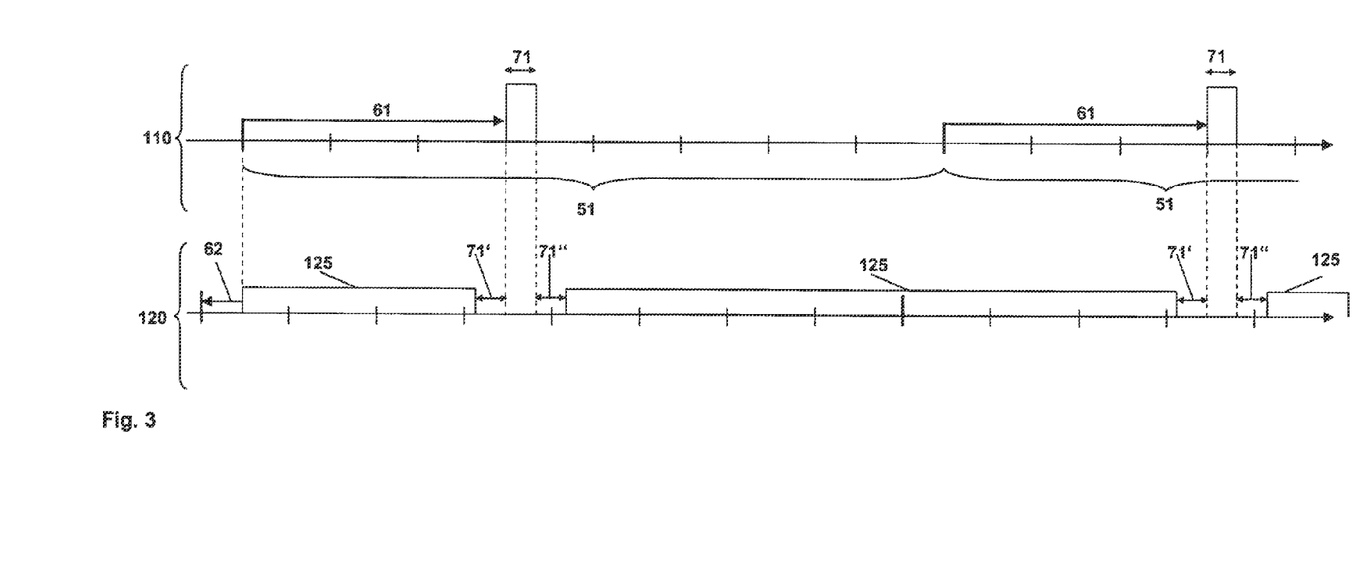
FIG. 3 schematically illustrates a timing scheme of the second mode of operation of the user equipment being registered both with the first public land mobile network and with the second public land mobile network.

In FIG. 3, a timing scheme of the second mode of operation of the user equipment 20 being registered both with the first public land mobile network 11 and with the second public land mobile network 12 is schematically shown. The upper part of FIG. 3 represents the exchange of the first radio frequency signal 110 of the user equipment 20 with the first public land mobile network 11 and the lower part of FIG. 3 represents the exchange of the second radio frequency signal 120 of the user equipment 20 with the second public land mobile network 12.

A paging occasion time interval 71 represents the time interval during which the user equipment 20 needs to be tuned to the first public land mobile network 11 in accordance to the discontinuous reception scheme used in the communication between the user equipment 20 and the first public land mobile network 11. The paging occasion time interval 71 is defined in relative terms with regard to a timing structure applied in the communication between the user equipment 20 and the first public land mobile network 11. In the example shown, a time interval 51 such as having the length of a radio frame (i.e. 2.56 s) is taken to be the repetition period of the discontinuous reception scheme. Within the time interval 51, a paging time 61 indicates (in relative terms) when the paging occasion time interval 71 starts (i.e. the paging time 61 is indicative of the time offset between the beginning of each time interval 51 and the actual beginning of the paging occasion time interval 71). By way of an absolute time offset 62 between the frame structure (or other time structure elements) of the first public land mobile network 11 and the second public land mobile network 12, it is possible to define the paging occasion time interval 71 also in absolute terms.

In order that the second public land mobile network 12 can take the repeating paging occasion time intervals 71 (of the communication between the user equipment 20 and the first public land mobile network 11) into account—while the user equipment 20 being in its second mode of operation, and especially in case that a (relatively important) transmission of data 125 occurs between the user equipment 20 and the second public land mobile network 12—the paging occasion time intervals 71 of the user equipment 20 in the discontinuous reception scheme of the first public land mobile network 11 need to be known (in absolute terms) to the second public land mobile network 12. This means that both the beginning and the length of the paging occasion time interval 71 needs to be known (in absolute terms) to the second public land mobile network 12.

According to an alternative variant of the present invention, this information about the paging occasion time interval 71 is transmitted to the second public land mobile network 12 upon entering the second mode of operation of the user equipment 20, i.e. the user equipment 20 changing to connected mode with respect to the second public land mobile network 12, especially by way of an RRC connection request message or an RRC connection request complete message to the second public land mobile network 12. According to another alternative variant of the present invention, this information about the paging occasion time interval 71 is transmitted to the second public land mobile network 12 after having entered the second mode of operation of the user equipment 20, i.e. while the user equipment 20 being in connected mode with respect to the second public land mobile network 12, preferably also by way of an RRC connection request message or an RRC connection request complete message to the second public land mobile network 12.

According to a preferred embodiment of the present invention, it is preferred that, in the second mode of operation of the user equipment 20, during the transmission of data 125 from the second public land mobile network 12 to the user equipment 20, the transmission of data 125 is also prevented during a first time interval 71' preceding the paging occasion time interval 71 and/or during a second time interval 71" following the paging occasion time interval 71.

The aim of the present invention is to provide for efficient operation of DSDS mobiles in a single PLMN or in a multitude of PLMNs.

It also provide for efficient operation of DSDS mobiles in a single PLMN while both subscription modules (SIMs) are using different radio access technologies (RATs), e.g. LTE for data service subscription, combined with GSM/GERAN for voice service subscription.

A further aim of the present invention is to prevent system inefficiency during data transmission in the second public land mobile network 12 while the DSDS user equipment 20 receives the paging channel from the first public land mobile network.

According to a special case, the first SIM card 21 and the second SIM card 22 can be registered in the same public land mobile network. This means that the terms "first public land mobile network 11" and "second public land mobile network 12" according to the present invention relate to the same public land mobile network, i.e. the first public land mobile network 11 and the second public land mobile network 12 are identical. Also in this specific case, it should be ensured that in the second mode of operation of the user equipment 20 the transmission of data 125 from the (identical) public land mobile network acting as second public land mobile network 12 according to the present invention is prevented during paging occasion time intervals 71 of discontinuous reception scheme when the (identical) public land mobile network is acting as the first public land mobile network 11 according to the present invention.

As an embodiment for this goal it is proposed that the DSDS mobile operating in the same RPLMN and preferably same RAT indicates this type of DSDS operation to the serving RPLMN. This can be archived for example by using RRC signaling or NAS signaling during the Attach procedure.

The paging occasion time interval 71 is communicated to the second public land mobile network 12. According to one example, the user equipment 20 indicates the relative difference of the discontinuous reception scheme applicable for the first public land mobile network 11 to the second public land mobile network 12. This relative timing difference is, e.g., expressed in milliseconds (ms) relative to an actual timing reference of the second public land mobile network 12 or it is being expressed in system (sub- or radio) frames.

According to the present invention, the first public land mobile network 11 acts, e.g., as a voice service public land mobile network, and the second public land mobile network 12 acts as a data service public land mobile network.

The second registered public land mobile network 12 provides data services by data packet transmission and reception to the DSDS user equipment 20. With a conventional system, the second registered public land mobile network 12 does not have any information that a certain terminal (i.e. the user equipment 20) is a DSDS terminal and might tune again for receiving the PCH (paging channel) from a first registered public land mobile network 11 while the data transmission 125 is ongoing. Without the temporary interruption of the data transmission 125 during the paging occasion time interval 71 (and preferably additionally the first and/or second time intervals 71', 71") according to the present invention, the autonomous change, by the user equipment 20, of its receiver (from the data reception of the second public land mobile network 12 to the paging channel reception of the first public land mobile network 11) would result in the additional retransmission of lost data packets in the second (registered) public land mobile network 12.

Exemplarily the data transmission 125 include, e.g., a continuous data stream such as a video or a data download. The second public land mobile network 12 schedules data towards the (DSDS) user equipment 20 on a shared channel called Physical Downlink Shared Channel (PDSCH) in case of HSPA. Depending on the scheduling algorithm used in the HSPA radio network for example the UE is scheduled with data in every transmission time interval (TTI) of 10 ms. So for the DSDS user equipment 20, this would mean that the PDSCH has to be continuously received. While being also registered to the first public land mobile network (e.g. for voice services), the user equipment 20 needs to ensure that the PCH of that first public land mobile network 11 is also received during the DRX occasions (i.e. during the paging occasion time intervals 71). As—without the inventive method—there would be no coordination between the first and second public land mobile networks 11, 12, the user equipment 20 will typically abort reception of the data transmission 125 of the second public land mobile network 12 at every DRX occasion (paging occasion time interval 71) for the first (registered) public land mobile network 11. During these times, which in this example might last tens of milliseconds, the user equipment 20 would not receive the data transmission 125 of the second public land mobile network 12, and all data being sent during this time interval would need to be retransmitted when the user equipment 20 being back to the second public land mobile network 12 and did not acknowledge the correct data reception.

The indication of the (absolute) time of the paging occasion time interval 71 can, e.g., be achieved by indication the relative timing offset between the paging occasion time interval 71 of the first public land mobile network 11, and either a timing structure of the second public land mobile network 12 or the discontinuous reception scheme that would be implemented with the second public land mobile network 12 in case that the user equipment 20 would not be in connected mode. The indication of the absolute time of the paging occasion time interval 71 can, e.g., be given in milliseconds (either from a timing structure of the second public land mobile network 12 or from the discontinuous reception scheme that would be implemented with the second public land mobile network 12 in case that the user equipment 20 would not be in connected mode). Exemplarily this could be achieved by an indication of the sort:

"paging occasion time interval 71 starts at [T0+x ms] (with x being between 0 and max. DRX cycle length (e.g. 2560 ms)), where T0 corresponds to a timing structure of the second public land mobile network 12 or to the discontinuous reception scheme that would be implemented with the second public land mobile network 12 in case that the user equipment 20 would not be in connected mode. Similar, especially for the operation of the DSDS user equipment 20 in the same PLMN and using the same RAT (Radio Access Technology), it can be achieved by indicating the relative timing offset in terms on number of system (sub- or radio) frames.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for using a user equipment with a first public land mobile network and a second public land mobile network, wherein the user equipment is a Dual Subscriber Identity Module (SIM) dual standby (DSDS) user equipment, wherein the first public land mobile network and the second public land mobile network are registered public land mobile networks relative to the user equipment, the method comprising:
operating the user equipment according to a discontinuous reception scheme in an idle mode of the user equipment with respect to the first public land mobile network, wherein, in the discontinuous reception scheme, a paging occasion time interval is defined based on a time interval corresponding to a discontinuous reception cycle length and a paging time within the time interval such that, in the discontinuous reception scheme, the user equipment only monitors a paging channel during the paging occasion time interval with respect to the first public and mobile network; and
operating the user equipment in a connected mode of the user equipment with respect to the second public land mobile network, wherein in the connected mode with respect to the second public land mobile network, transmission of data from the second public land mobile network to the user equipment is prevented by the second public land mobile network during the paging occasion time interval of the discontinuous reception scheme corresponding to the first public land mobile network based on information regarding the paging occasion time interval with respect to the first public land mobile network transmitted to the second public land mobile network by the user equipment, wherein transmitting the information regarding the paging occasion time interval is performed during operating the user equipment, with respect to the second public land mobile network, in the connected mode of the user equipment.

2. The method according to claim 1, wherein transmission of data from the second public land mobile network to the user equipment is further prevented during at least one of the group consisting of: a first time interval preceding the paging occasion time interval or a second time interval following the paging occasion time interval.

3. The method according to claim 1, wherein transmission of data from the second public land mobile network to the user equipment is prevented by the second public and mobile network during the paging occasion time interval of the discontinuous reception scheme corresponding to the first public and mobile network further based on offset information that indicates an absolute time offset between a radio frame in the first public land mobile network and a radio frame in the second public land mobile network.

4. The method according to claim 1, wherein the information regarding the paging occasion time interval is transmitted using a Radio Resource Control (RRC) message or using a RRC connection request complete message.

5. A Dual Subscriber Identity Module (SIM) dual standby (DSDS) user equipment for use with a first public land mobile network and a second public land mobile network, wherein the first public land mobile network and the second public land mobile network are registered public land mobile networks relative to the user equipment, the user equipment comprising a processor, the processor being configured for:
operating the user equipment according to a discontinuous reception scheme in an idle mode of the user equipment with respect to the first public land mobile network, wherein, in the discontinuous reception scheme, a paging occasion time interval is defined based on a time interval corresponding to a discontinuous reception cycle length and a paging time within the time interval such that, in the discontinuous reception scheme, the user equipment only monitors a paging channel during the paging occasion time interval with respect to the first public land mobile network; and
operating the user equipment in a connected mode of the user equipment with respect to the second public land mobile network, wherein in the connected mode with respect to the second public land mobile network, transmission of data from the second public land mobile network to the user equipment is prevented by the second public land mobile network during the paging occasion time interval of the discontinuous reception scheme corresponding to the first public land mobile network based on information regarding the paging occasion time interval with respect to the first public land mobile network transmitted to the second public land mobile network by the user equipment, wherein transmitting the information regarding the paging occasion time interval is performed during operating the user equipment, with respect to the second public land mobile network, in the connected mode of the user equipment.

6. The DSDS user equipment according to claim 5, wherein transmission of data from the second public land mobile network to the user equipment is further prevented during at least one of the group consisting of: a first time interval preceding the paging occasion time interval and a second time interval following the paging occasion time interval.

7. The DSDS user equipment according to claim 5, wherein transmission of data from the second public land mobile network to the user equipment is prevented by the second public land mobile network during the paging occasion time interval of the discontinuous reception scheme corresponding to the first public land mobile network further based on offset information that indicates an absolute time offset between a radio frame in the first public land mobile network and a radio frame in the second public land mobile network.

8. The DSDS user equipment according to claim 5, wherein the processor is configured for transmitting the information regarding the paging occasion time interval using a Radio Resource Control (RRC) message or using a RRC connection request complete message.

9. A non-transitory processor-readable medium having processor-executable instructions stored thereon for using a user equipment with a first public land mobile network and a second public land mobile network, wherein the user equipment is a Dual Subscriber Identity Module (SIM) dual standby (DSDS) user equipment, wherein the first public land mobile network and the second public land mobile network are registered public land mobile networks relative to the user equipment, the processor-executable instructions, when executed, facilitating performance of the following:

operating the user equipment according to a discontinuous reception scheme in an idle mode of the user equipment with respect to the first public land mobile network, wherein, in the discontinuous reception scheme, a paging occasion time interval is defined based on a time interval corresponding to a discontinuous reception cycle length and a paging time within the time interval such that, in the discontinuous reception scheme, the user equipment only monitors a paging channel during the paging occasion time interval with respect to the first public land mobile network; and operating the user equipment in a connected mode of the user equipment with respect to the second public land mobile network, wherein in the connected mode with respect to the second public land mobile network, transmission of data from the second public land mobile network to the user equipment is prevented by the second public land mobile network during the paging occasion time interval of the discontinuous reception scheme corresponding to the first public land mobile network based on information regarding the paging occasion time interval with respect to the first public land mobile network transmitted to the second public land mobile network by the user equipment, wherein transmitting the information regarding the paging occasion time interval is performed during operating the user equipment, with respect to the second public land mobile network in the connected mode of the user equipment.

10. The non-transitory processor-readable medium according to claim 9, wherein transmission of data from the second public land mobile network to the user equipment is prevented by the second public land mobile network during the paging occasion time interval of the discontinuous reception scheme corresponding to the first public land mobile network further based on offset information that indicates an absolute time offset between a radio frame in the first public land mobile network and a radio frame in the second public land mobile network.

* * * * *